US012722521B2

(12) United States Patent
Saita

(10) Patent No.: US 12,722,521 B2
(45) Date of Patent: Sep. 1, 2026

(54) CHARGE CONTROL SYSTEM

(71) Applicant: HONDA MOTOR CO., LTD., Tokyo (JP)

(72) Inventor: Akira Saita, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 751 days.

(21) Appl. No.: 18/128,057

(22) Filed: Mar. 29, 2023

(65) Prior Publication Data

US 2023/0311699 A1 Oct. 5, 2023

(30) Foreign Application Priority Data

Mar. 30, 2022 (JP) ................................ 2022-056604

(51) Int. Cl.

| | |
|---|---|
| ***H02J 7/00*** | (2026.01) |
| ***B60L 53/62*** | (2019.01) |
| ***B60L 53/66*** | (2019.01) |
| ***B60L 58/12*** | (2019.01) |
| ***H02J 7/82*** | (2026.01) |
| ***H02J 7/84*** | (2026.01) |

(52) U.S. Cl.

CPC ............... *B60L 53/66* (2019.02); *B60L 53/62* (2019.02); *B60L 58/12* (2019.02); *H02J 7/82* (2026.01); *H02J 7/84* (2026.01)

(58) Field of Classification Search

None

See application file for complete search history.

(56) References Cited

U.S. PATENT DOCUMENTS

| | | | | |
|---|---|---|---|---|
| 10,836,371 | B1 * | 11/2020 | Thiruvengadam .. | B60W 50/085 |
| 2012/0256588 | A1 | 10/2012 | Hayashi et al. | |
| 2012/0283902 | A1 | 11/2012 | Kusumi et al. | |
| 2012/0299554 | A1 | 11/2012 | Kruglick | |
| 2018/0050601 | A1 | 2/2018 | Katanoda | |
| 2018/0201149 | A1 | 7/2018 | Kinomura | |
| 2021/0138928 | A1 | 5/2021 | O'Gorman et al. | |

FOREIGN PATENT DOCUMENTS

| | | | |
|---|---|---|---|
| CN | 107757391 | A | 3/2018 |
| CN | 110605982 | A | 12/2019 |
| CN | 111983494 | A | 11/2020 |
| CN | 112572229 | A | 3/2021 |
| CN | 112776620 | A | 5/2021 |

(Continued)

OTHER PUBLICATIONS

Jan. 9, 2024, Translation of Japanese Office Action issued for related JP Application No. 2022-056604.

(Continued)

*Primary Examiner* — Arun C Williams

(74) *Attorney, Agent, or Firm* — Paratus Law Group, PLLC

(57) ABSTRACT

A charge control system for a battery mounted on an electric vehicle includes processing circuitry configured to: acquire an intention of a user related to charge; set a range of an upper limit SOC based on the intention of the user, the upper limit SOC being a SOC for ending the charge of the battery; acquire power consumption history of the battery; and set the upper limit SOC in the range of the upper limit SOC based on the power consumption history.

6 Claims, 7 Drawing Sheets

(56) References Cited

FOREIGN PATENT DOCUMENTS

| | | | |
|---|---|---|---|
| JP | H09-294303 | A | 11/1997 |
| JP | 2012-085396 | A | 4/2012 |
| JP | 2012-228165 | A | 11/2012 |
| JP | 5847923 | B2 | 1/2016 |
| JP | 2018-114874 | A | 7/2018 |
| WO | WO 2011/061809 | A1 | 5/2011 |
| WO | WO 2015/019387 | A1 | 2/2015 |

OTHER PUBLICATIONS

Nov. 26, 2025, Translation of Chinese Office Action issued for related CN Application No. 202310324675.0.

* cited by examiner

FIG. 3

| CHARGE MODE | UPPER LIMIT SOC SETTING RANGE | CHARGE COUNT |
|---|---|---|
| 100% CHARGE | 100% | – |
| BALANCED CHARGE | 80% - 100% | 1 TO 2 TIMES PER WEEK |
| CARING CHARGE | 60% - 100% | 3 TO 4 TIMES PER WEEK |

Figure 5:
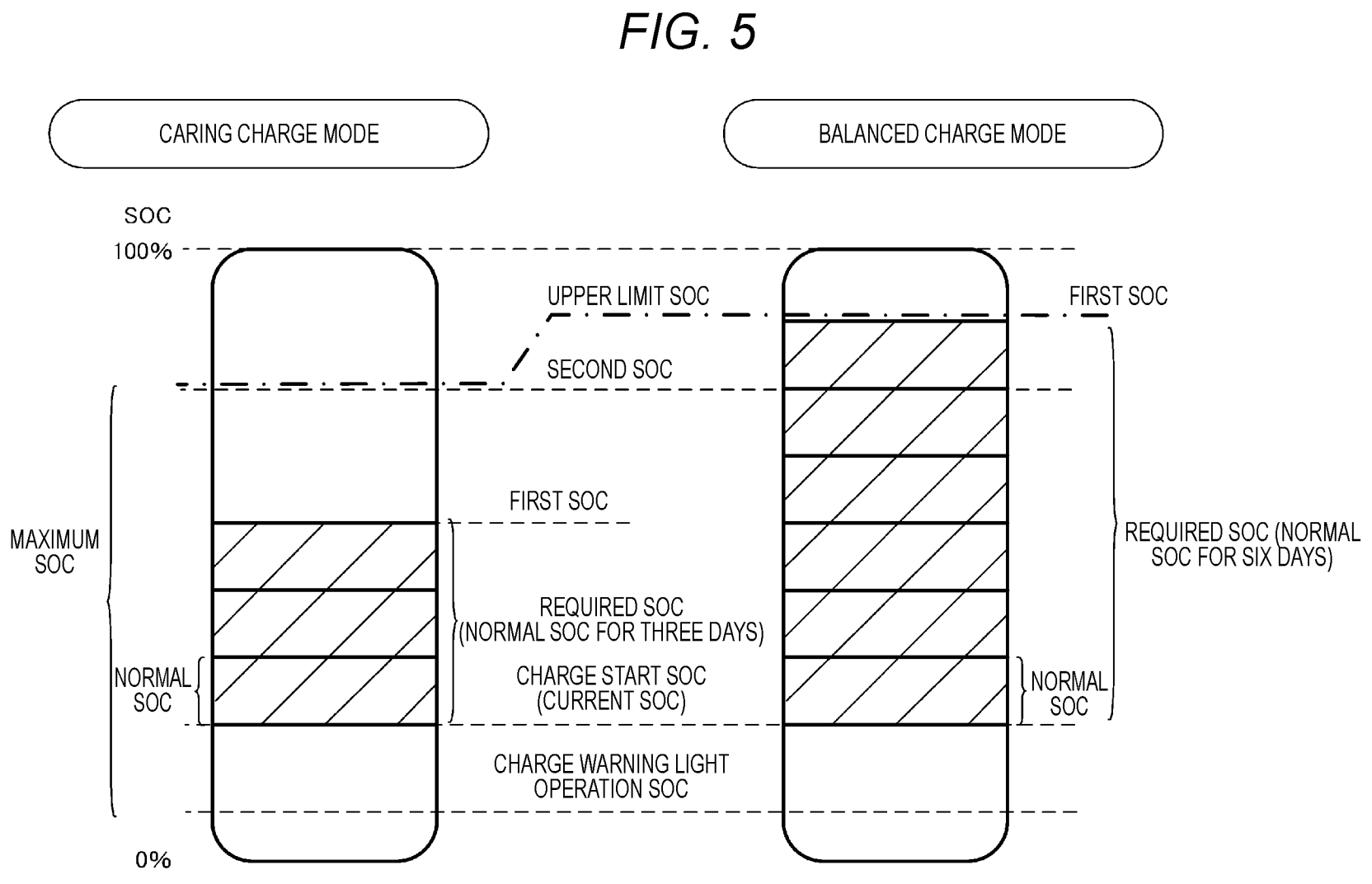

CARING CHARGE MODE

BALANCED CHARGE MODE

SOC

100%

0%

MAXIMUM SOC

NORMAL SOC

FIRST SOC

SECOND SOC

UPPER LIMIT SOC

REQUIRED SOC (NORMAL SOC FOR THREE DAYS)

CHARGE START SOC (CURRENT SOC)

CHARGE WARNING LIGHT OPERATION SOC

FIRST SOC

NORMAL SOC

REQUIRED SOC (NORMAL SOC FOR SIX DAYS)

CHARGE CONTROL SYSTEM

CROSS-REFERENCE TO RELATED APPLICATIONS

This application is based on and claims priority under 35 USC 119 from Japanese Patent Application No. 2022-056604 filed on Mar. 30, 2022, the entire content of which is incorporated herein by reference.

TECHNICAL FIELD

The present invention relates to a charge control system mounted on an electric vehicle.

BACKGROUND ART

In recent years, research and development on power-charging/supplying of a vehicle on which a secondary battery is mounted that contributes to improvement in energy efficiency have been carried out to secure access to affordable, reliable, sustainable, and modern energy for more people.

Incidentally, in the power-charging/supplying of the vehicle on which the secondary battery is mounted, it has been proposed that an upper limit SOC (State Of Charge) that is a SOC for ending charge of the battery is set to be lower than a full charge SOC (for example, JP5847923B, JPH9-294303A, and JP2018-114874A).

When the upper limit SOC is set to be low, deterioration of the battery can be prevented, and a battery life can be expected to be extended, but a charge count may increase or a so-called power shortage in which power is insufficient may occur. Therefore, it is preferable that an intention of the user is reflected in setting the upper limit SOC.

An aspect of the present disclosure relates to provide a charge control system that can set an upper limit SOC by reflecting an intention of a user.

SUMMARY OF INVENTION

According to an aspect of the present disclosure, there is provided a charge control system for a battery mounted on an electric vehicle. The charge control system includes processing circuitry configured to: acquire an intention of a user related to charge; set a range of an upper limit SOC based on the intention of the user, the upper limit SOC being a SOC for ending the charge of the battery; acquire power consumption history of the battery; and set the upper limit SOC in the range of the upper limit SOC based on the power consumption history.

BRIEF DESCRIPTION OF DRAWINGS

FIG. 3 is a table illustrating a plurality of charge modes:

FIG. 4 is a diagram showing a charge mode setting screen:

FIG. 5 is a diagram illustrating upper limit SOCs of the charge modes;

DESCRIPTION OF EMBODIMENTS hereinafter, an embodiment of the present invention will be described with reference to FIGS. 1 to 7.

Figure 1:
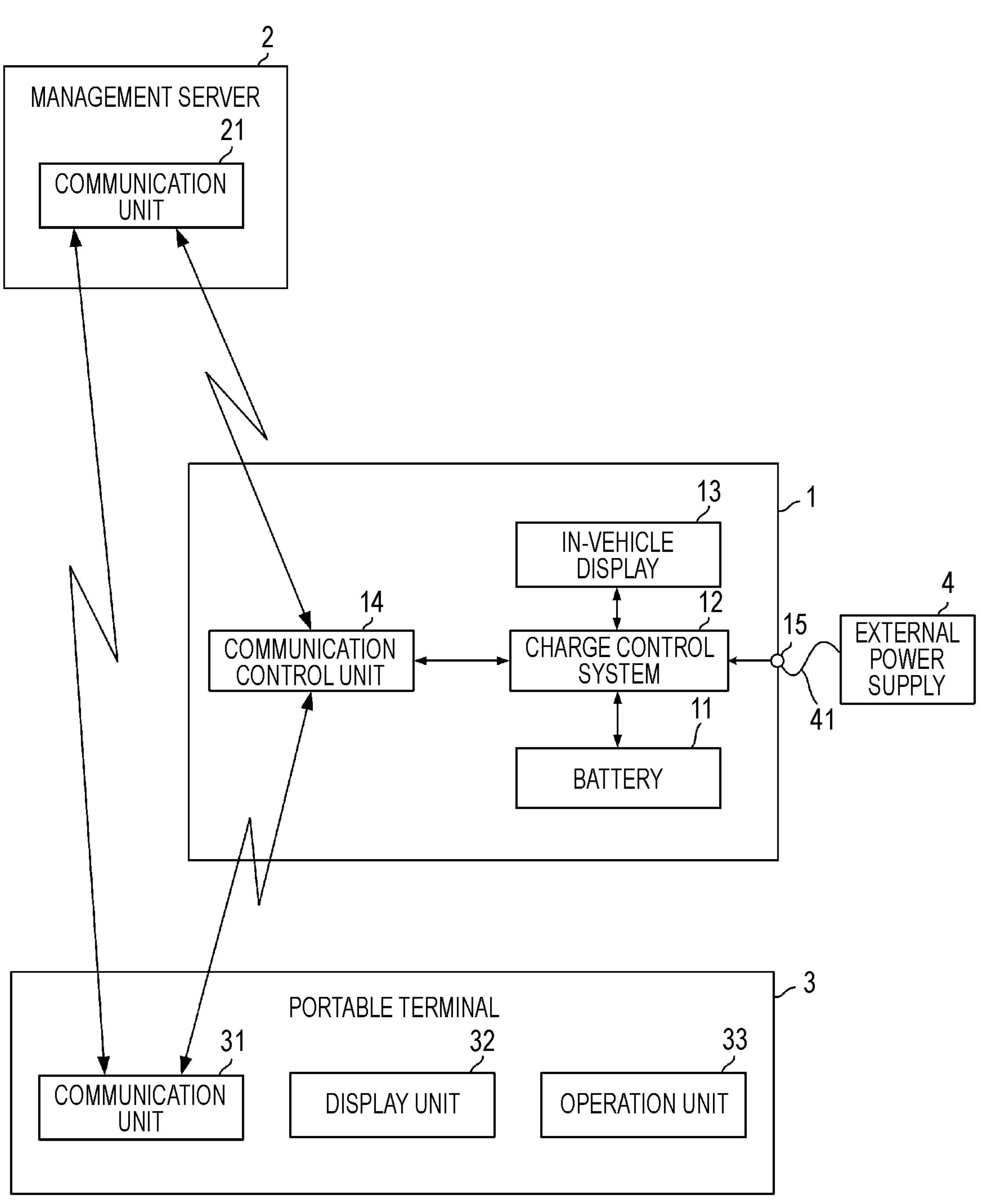
FIG. 1 is a diagram showing a relationship among a vehicle 1 including a battery 11 and a charge control system 12, a management server 2, and a portable terminal 3 of a user.

FIG. 1 is a diagram showing a relationship among a vehicle 1 including a battery 11 and a charge control system 12, a management server 2, and a portable terminal 3 of a user. In the present embodiment, the vehicle 1 may be any vehicle as long as the vehicle 1 can be moved by a power supply from the battery 11. Therefore, the present embodiment can be applied to various vehicles 1 such as a two-wheeled vehicle, a three-wheeled vehicle, and a four-wheeled vehicle. Further, the vehicle 1 includes an electric vehicle that travels by the power supply from the battery 11, and a hybrid vehicle including a motor that performs drive by receiving the power supply from the battery 11 and an internal combustion engine. Further, in the present embodiment, as shown in FIG. 1, a case where the battery 11 is charged from an external power supply 4 by a plug-in method will be described, but the battery 11 may be charged from the external power supply 4 by a non-contact power supply method.

As shown in FIG. 1, the vehicle 1 includes the battery 11, a charge control system 12, an in-vehicle display 13, a communication control unit 14, and a charge port 15. The external power supply 4 is, for example, charge equipment installed in a site of home of a user of the vehicle 1. When the vehicle 1 is in the site, the user establishes a state where the charge from the external power supply 4 to the battery 11 is enabled by inserting a charge connector (charge gun) provided at a tip end of a cable 41 that extends from the external power supply 4 into the charge port 15.

When the charge connector is connected to the charge port 15, the charge control system 12 controls the charge from the external power supply 4 to the battery 11. Further, the charge control system 12 sets an upper limit SOC that is a SOC for ending the charge of the battery 11. Functional configurations provided in the charge control system 12 in order to set the upper limit SOC will be described later. In the present embodiment, the charge control system 12 is mounted on the vehicle 1, but the charge control system 12 may be mounted on the management server 2 or the portable terminal 3, or may be dispersedly mounted on the vehicle 1, the management server 2, and the portable terminal 3.

The in-vehicle display 13 is a navigation device or the like provided in the vehicle 1. Therefore, the in-vehicle display 13 can display the various pieces of information as images and output the information as sound. Further, the in-vehicle display 13 includes an operation unit such as a touch panel that receives an operation input from the user.

The communication control unit 14 can transmit and receive information to and from the management server 2 and the portable terminal 3 by wireless communication. For example, the communication control unit 14 transmits information (for example, a current SOC, a charge warning notification, and a charge mode change request) on charge control of the battery 11 to the management server 2 or the portable terminal 3, and receives instruction information (for example, a charge mode change instruction) on the charge control from the management server 2 or the portable terminal 3.

The management server 2 includes a communication unit 21. The communication unit 21 can transmit and receive information to and from the communication control unit 14 of the vehicle 1 and the portable terminal 3 by wireless communication. For example, the communication unit 21 mediates communication between the communication control unit 14 of the vehicle 1 and the portable terminal 3.

The portable terminal 3 is, for example, a smart device such as a smartphone, and includes a communication unit 31, a display unit 32, and an operation unit 33. The communication unit 31 can transmit and receive information to and from the communication unit 21 of the management server 2 and the communication control unit 14 of the vehicle 1 by the wireless communication. The display unit 32 displays various pieces of information as images. The operation unit 33 is a touch panel or the like that receives an operation input from the user.

Next, functional configurations of the charge control system 12 will be described.

Figure 2:
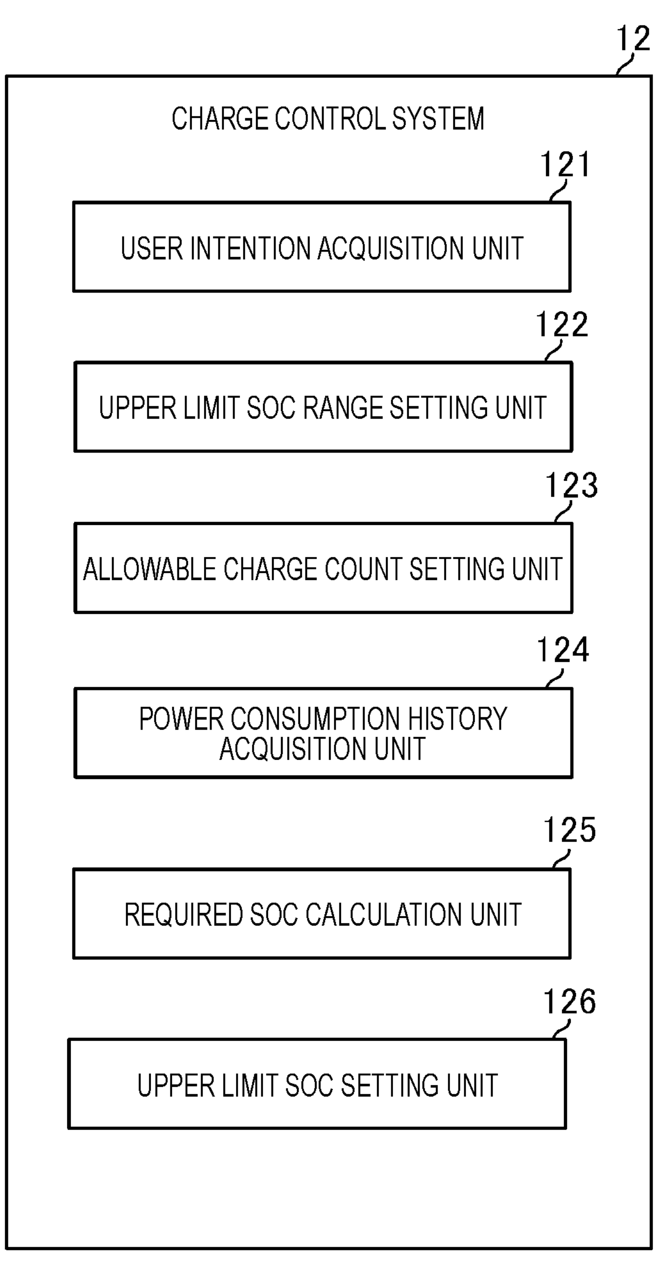
FIG. 2 is a block diagram showing functional configurations of the charge control system 12.

The charge control system 12 includes hardware including a control processor such as a CPU and a storage device such as a ROM, a RAM, and a storage, and software such as a charge control program stored in the ROM or the storage. As shown in FIG. 2, the charge control system 12 includes a user intention acquisition unit 121, an upper limit SOC range setting unit 122, an allowable charge count setting unit 123, a power consumption history acquisition unit 124, a required SOC calculation unit 125, and an upper limit SOC setting unit 126, as functional configurations implemented by cooperation between the hardware and the software.

The user intention acquisition unit 121 acquires an intention of the user related to the charge. For example, as shown in FIG. 3, a plurality of charge modes in each of which a range of the upper limit SOC and an allowable charge count are set are prepared in advance, and any one of the plurality of charge modes is set based on an input from the user. In the present embodiment, a 100% charge mode and a balanced charge mode are prepared as charge count priority modes in which a charge count is prioritized, and a caring charge mode is prepared as a battery life priority mode in which a life of the battery 11 is prioritized.

In the battery life priority mode, an allowable charge count is larger than that in the charge count priority mode, and a lower limit value of a setting range of the upper limit SOC is lower than that in the charge count priority mode. For example, as shown in FIG. 3, in the caring charge mode, an upper limit SOC setting range is set to 60% to 100%, and an allowable charge count is set to three to four times a week, and in the balanced charge mode, the upper limit SOC setting range is set to 80% to 100%, and the allowable charge count is set to one to two times a week. In the 100% charge mode, the upper limit SOC setting range is set to 100%.

Figure 4:
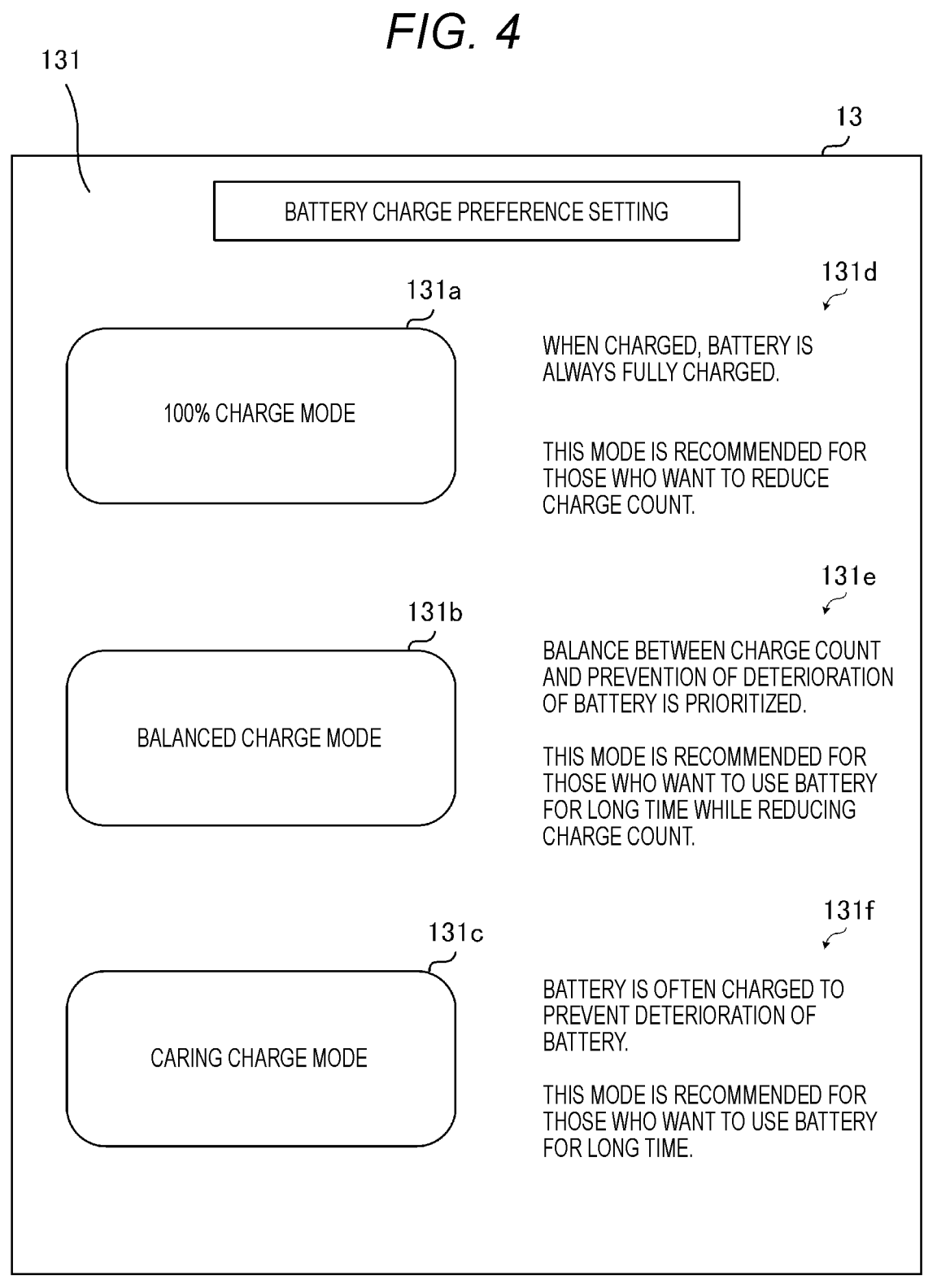

The user sets a charge mode by, for example, displaying a setting screen 131 as shown in FIG. 4 on the in-vehicle display 13. The setting screen 131 includes a plurality of mode selection buttons 131*a*, 131*b*, and 131*c* that can select the charge modes by a touch operation (tap operation), and descriptions 131*d*, 131*e*, and 131*f* of the charge modes. The user reads the descriptions 131*d*, 131*e*, and 131*f* of the charge modes to select a preferred charge mode, and touches the mode selection button 131*a*, 131*b*, or 131*c* of the selected charge mode to enable the selected charge mode.

Based on an intention of the user, the upper limit SOC range setting unit 122 sets a range of the upper limit SOC that is a SOC for ending the charge of the battery 11. For example, as shown in FIG. 3, when a charge mode selected by the user is the caring charge mode, the upper limit SOC setting range is set to 60% to 100%, when a charge mode selected by the user is the balanced charge mode, the upper limit SOC setting range is set to 80% to 100%, and when a charge mode selected by the user is the 100% charge mode, the upper limit SOC setting range is set to 100%.

Based on the intention of the user or charge behavior history of the user, the allowable charge count setting unit 123 sets the allowable charge count in a predetermined period. The predetermined period is, for example, one week. As shown in FIG. 3, for example, when a charge mode selected by the user is the caring charge mode, the allowable charge count is set to three to four times a week, and when a charge mode selected by the user is the balanced charge mode, the allowable charge count is set to one to two times a week. When a charge mode selected by the user is the 100% charge mode, the allowable charge count in the predetermined period is not set.

The power consumption history acquisition unit 124 acquires power consumption history of the battery 11. For example, the power consumption history acquisition unit 124 acquires a SOC at the time of departing from home and a SOC at the time of returning home, calculates a ΔSOC (%/day) used in one day based on a difference thereof, and registers the ΔSOC in the storage unit in association with date data.

Based on the power consumption history and the allowable charge count, the required SOC calculation unit 125 calculates a required SOC that is a SOC required for one-time charge. For example, as shown in FIG. 5, based on the power consumption history, the required SOC calculation unit 125 multiplies a normal SOC, which is a SOC normally consumed in one day, by the required number of days (for example, three days in the caring charge mode, and six days in the balanced charge mode) determined by the allowable charge count (charge mode) to calculate the required SOC. Further, based on the power consumption history, the required SOC calculation unit 125 acquires a maximum SOC that is a maximum SOC consumed in one day in a past predetermined period. The past predetermined period is, for example, one week started from a previous day, one week in a previous week, or the like to be calculated. When acquiring the maximum SOC, even if the maximum value is not simply obtained, data having a maximum consumption SOC in travel data excluding irregular travel (outlier) may be set as the maximum value.

Based on the required SOC, the upper limit SOC setting unit 126 sets the upper limit SOC in the range of the upper limit SOC. For example, as shown in FIG. 5, the upper limit SOC setting unit 126 acquires a first SOC obtained by adding the required SOC to a current SOC (current SOC) of the battery 11 and a second SOC obtained by adding the maximum SOC to a reference SOC, and sets a larger one of the first SOC and the second SOC as the upper limit SOC. The reference SOC may be a charge warning light operation SOC that is a SOC for a charge warning light of the vehicle 1 to operate, may be a SOC use lower limit value of the battery 11, or may be a set value set by the charge control system 12 or the user. The set value set by the charge control system 12 is, for example, the normal SOC that is the SOC normally consumed in one day, or a SOC set to the normal SOC in consideration of a calculation error (for example, 5%). In the example of FIG. 5, the reference SOC is described as the charge warning light operation SOC that is the SOC for the charge warning light of the vehicle 1 to operate.

In the example of FIG. 5, if a charge mode is the caring charge mode, the second SOC is set to the upper limit SOC, and if a charge mode is the balanced charge mode, the first SOC is set to the upper limit SOC.

When the upper limit SOC cannot be set in the range of the upper limit SOC based on the required SOC, the upper limit SOC setting unit 126 requests the user to change the charge mode. For example, a screen on which a change in the charge mode is requested is displayed on the in-vehicle display 13, or a charge mode change request notification is transmitted to the portable terminal 3. When the user changes the charge mode according to the request, the upper limit SOC setting unit 126 sets the upper limit SOC based on the changed charge mode.

According to the charge control system 12 configured in this way, since the range of the upper limit SOC is set based on the intention of the user, it is possible to perform charge reflecting the intention of the user. Accordingly, the upper limit SOC can be set low for a user who gives priority to a battery life. On the other hand, the upper limit SOC can be set high for a user who wants to reduce the charge count. Further, the charge control system 12 sets the upper limit SOC based on the required SOC required for one-time charge. Therefore, it is possible to prevent so-called power shortage in which power is insufficient while reflecting the intention of the user. Further, the charge control system 12 can avoid a charge amount being insufficient even if a distance corresponding to a maximum SOC in a past predetermined period is traveled while considering the intention of the user by setting the larger one of the first SOC and the second SOC as the upper limit SOC.

Since the user only needs to select a charge mode in which the range of the upper limit SOC and the allowable charge count are associated with each other, it is possible to avoid troublesome setting. In the charge mode in which the charge count is prioritized, it is possible to sufficiently secure one-time charge amount to suppress the charge count. Further, in the charge mode in which the battery life is prioritized, the battery life is prevented from being shortened. Further, when the charge control system 12 cannot meet the intention of the user, the charge control system 12 prompts the user to change a charge mode, so that it can be avoided that the battery is charged in a charge mode not intended by the user. When a charge mode is changed, the upper limit SOC is set in the changed charge mode, so that it is possible to perform charge in an optimum charge mode.

Next, a process procedure of the charge control system 12 will be described with reference to FIGS. 6 and 7.

Figure 6:
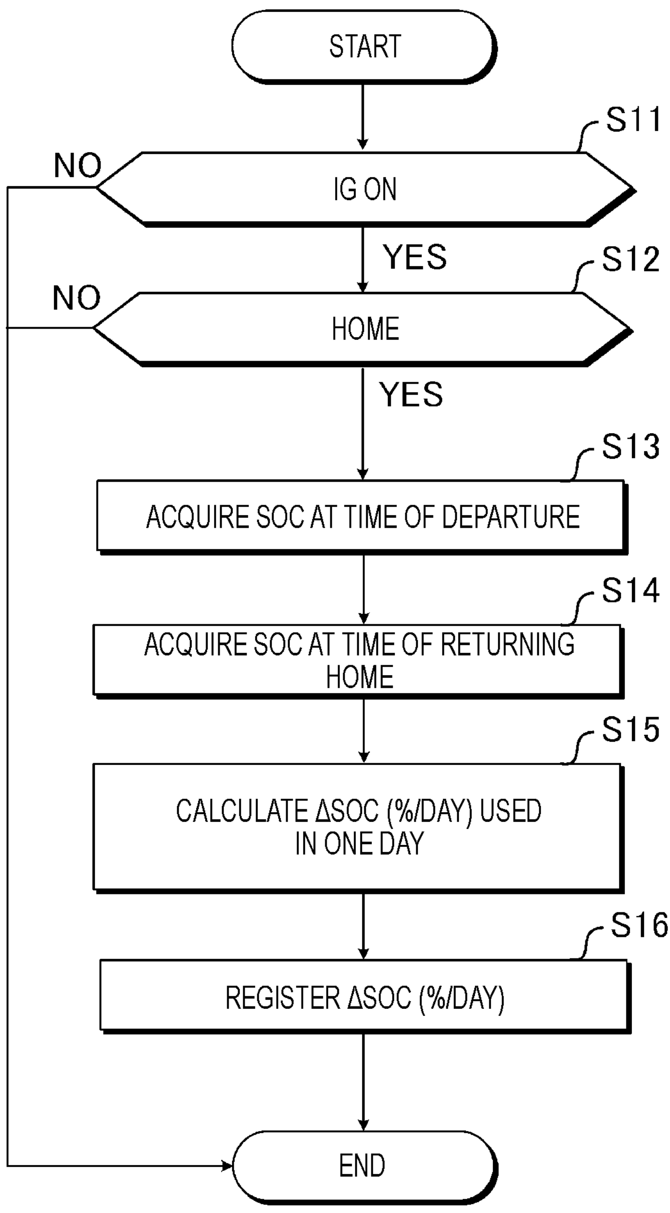
FIG. 6 is a flowchart of registration of power consumption history.

In registration of the power consumption history shown in FIG. 6, the charge control system 12 determines whether an ignition switch of the vehicle 1 is ON (S11), and determines whether a position of the vehicle 1 is home (S12). When any one of determination results is NO, the charge control system 12 ends the process. When both the determination results in step S11 and step S12 are YES, the charge control system 12 acquires a SOC at the time of departure (S13), and acquires a SOC at the time of returning home (S14). Thereafter, the charge control system 12 calculates a ΔSOC (%/day) used in one day (S15), and registers the calculated ΔSOC in the storage unit (S16).

Figure 7:
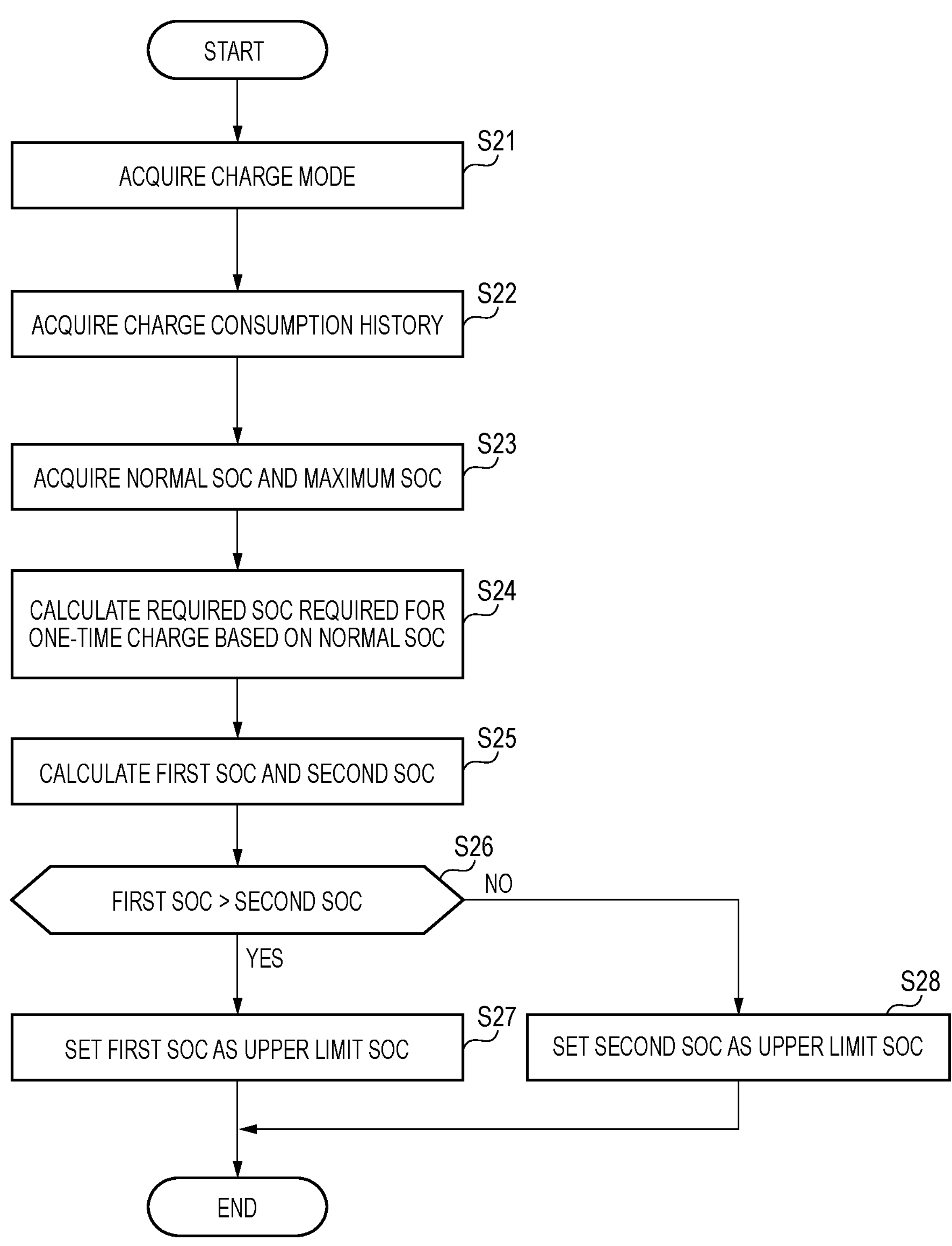
FIG. 7 is a flowchart showing setting of the upper limit SOC.

In setting of the upper limit SOC shown in FIG. 7, the charge control system 12 acquires a charge mode and charge consumption history (S21, S22), and acquires a normal SOC and a maximum SOC from the charge consumption history (S23). Further, the charge control system 12 calculates a required SOC required for one-time charge based on the normal SOC (S24), and calculates a first SOC and a second SOC (S25). Thereafter, the charge control system 12 determines whether the first SOC is larger than the second SOC (S26). When the determination result is YES, that is, when the first SOC is larger, the charge control system 12 sets the first SOC as the upper limit SOC (S27). When the determination result is NO, that is, when the second SOC is larger, the charge control system 12 sets the second SOC as the upper limit SOC (S28).

Although the embodiments are described above with reference to the drawings, it is needless to say that the present invention is not limited to such examples. It is apparent that those skilled in the art can conceive of various modifications and alterations within the scope described in the claims, and it is understood that such modifications and alterations naturally fall within the technical scope of the present invention. Further, the constituent elements in the embodiments described above may be combined freely within a range not departing from the spirit of the invention.

For example, in the above-described embodiment, it is configured that the plurality of charge modes in each of which the range of the upper limit SOC and the allowable charge count are set are provided to the user, and the user selects one charge mode from the plurality of charge modes. However, in the charge mode, only the range of the upper limit SOC may be set. Further, the range of the upper limit SOC may be configured to be input by the user himself/herself. In this case, the upper limit SOC setting unit 126 sets the upper limit SOC in the input range of the upper limit SOC based on the power consumption history.

Further, the allowable charge count in a predetermined period (for example, one week) may be also configured to be input by the user himself/herself. In this case, the allowable charge count setting unit 123 sets a numerical value input by the user as the allowable charge count. Further, the allowable charge count setting unit 123 may set the allowable charge count based on the charge behavior history of the user. For example, in a case of a user who performs the charge two times a week, the allowable charge count setting unit 123 sets a charge count that allows the allowable charge count per week to two. When the range of the upper limit SOC and the allowable charge count are set, the upper limit SOC setting unit 126 sets the upper limit SOC in the range of the upper limit SOC based on the required SOC required for the one-time charge.

In the present specification, at least the following matters are described. Although corresponding constituent elements or the like in the above-described embodiment are shown in parentheses, the present invention is not limited thereto.

(1) A charge control system (the charge control system 12) for a battery (the battery 11) mounted on an electric vehicle (the vehicle 1), the charge control system including:

- a user intention acquisition unit (the user intention acquisition unit 121) configured to acquire an intention of a user related to charge;
- an upper limit SOC range setting unit (the upper limit SOC range setting unit 122) configured to set a range of an upper limit SOC based on the intention of the user, the upper limit SOC being a SOC for ending the charge of the battery;
- a power consumption history acquisition unit (the power consumption history acquisition unit 124) configured to acquire power consumption history of the battery; and
- an upper limit SOC setting unit (the upper limit SOC setting unit 126) configured to set the upper limit SOC in the range of the upper limit SOC based on the power consumption history.

According to (1), since the range of the upper limit SOC is set based on the intention of the user, it is possible to perform charge reflecting the intention of the user. Accordingly, the upper limit SOC can be set low for a user who gives priority to a battery life. On the other hand, the upper limit SOC can be set high for a user who wants to reduce the charge count.

(2) The charge control system according to (1), further including:

an allowable charge count setting unit (the allowable charge count setting unit 123) configured to set an allowable charge count in a predetermined period based on the intention of the user or charge behavior history of the user; and a required SOC calculation unit (the required SOC calculation unit 125) configured to calculate a required SOC based on the power consumption history and the allowable charge count, the required SOC being a SOC required for one-time charge, in which the upper limit SOC setting unit sets the upper limit SOC in the range of the upper limit SOC based on the required SOC.

According to (2), since the upper limit SOC is set based on the required SOC required for one-time charge, it is possible to prevent power shortage while reflecting the intention of the user.

(3) The charge control system according to (2), further including:

a plurality of charge modes in each of which the range of the upper limit SOC and the allowable charge count are set, in which the user intention acquisition unit sets any one of the plurality of charge modes based on an input from the user.

According to (3), since the user only needs to select a mode in which the range of the upper limit SOC and the allowable charge count are associated with each other, it is possible to avoid troublesome setting.

(4) The charge control system according to (3), in which the plurality of charge modes include a charge count priority mode and a battery life priority mode, and in which the allowable charge count in the battery life priority mode is larger than that in the charge count priority mode, and a lower limit value of a setting range of the upper limit SOC in the battery life priority mode is lower than that in the charge count priority mode.

According to (4), the one-time charge amount can be sufficiently secured in the charge count priority mode. Further, in the battery life priority mode, the charge is performed in consideration of the battery life, so that the battery life can be prevented from being shortened.

(5) The charge control system according to (3) or (4), in which when the upper limit SOC setting unit cannot set the upper limit SOC in the range of the upper limit SOC based on the required SOC, the upper limit SOC setting unit requests the user to change the charge mode.

According to (5), when the intention of the user cannot be met, the user is prompted to change the charge mode, so that it can be avoided that the battery is charged in a charge mode not intended by the user.

(6) The charge control system according to (5), in which when the charge mode is changed, the upper limit SOC setting unit sets the upper limit SOC based on the changed charge mode.

According to (6), when the charge mode is changed, it is possible to perform the charge in an optimum charge mode by setting the upper limit SOC in the changed charge mode.

(7) The charge control system according to any one of (2) to (6), in which based on the power consumption history, the required SOC calculation unit acquires the required SOC obtained by multiplying a normal SOC by a required number of days determined by the allowable charge count, the normal SOC being a SOC normally consumed in one day, and a maximum SOC in a past predetermined period obtained from the power consumption history, and in which the upper limit SOC setting unit acquires a first SOC obtained by adding the required SOC to a current SOC, and a second SOC obtained by adding the maximum SOC to a reference SOC, and the upper limit SOC setting unit sets a larger one of the first SOC and the second SOC as the upper limit SOC.

According to (7), the larger one of the first SOC and the second SOC is set as the upper limit SOC, so that even if a distance corresponding to the maximum SOC in the past predetermined period is traveled, it is possible to avoid the charge amount being insufficient while considering the intention of the user.

What is claimed is:

1. A charge control system for a battery mounted on an electric vehicle, the charge control system comprising processing circuitry configured to:

acquire an intention of a user related to charge;

set a range of an upper limit SOC based on the intention of the user, the upper limit SOC being a SOC for ending the charge of the battery;

acquire power consumption history of the battery; and set the upper limit SOC in the range of the upper limit SOC based on the power consumption history, wherein the processing circuitry is further configured to:

set an allowable charge count in a predetermined period based on the intention of the user or charge behavior history of the user; and calculate a required SOC based on the power consumption history and the allowable charge count, the required SOC being a SOC required for one-time charge, and wherein the processing circuitry sets the upper limit SOC in the range of the upper limit SOC based on the required SOC.

2. The charge control system according to claim 1, wherein the processing circuitry has a plurality of charge modes in each of which the range of the upper limit SOC and the allowable charge count are set, and wherein the processing circuitry sets any one of the plurality of charge modes based on an input from the user.

3. The charge control system according to claim 2, wherein the plurality of charge modes includes a charge count priority mode and a battery life priority mode, and wherein the allowable charge count in the battery life priority mode is larger than that in the charge count priority mode, and a lower limit value of a setting range of the upper limit SOC in the battery life priority mode is lower than that in the charge count priority mode.

4. The charge control system according to claim 2, wherein when the processing circuitry cannot set the upper limit SOC in the range of the upper limit SOC based on the required SOC, the processing circuitry requests the user to change the charge mode.

5. The charge control system according to claim 4, wherein when the charge mode is changed, the processing circuitry sets the upper limit SOC based on the changed charge mode.

6. The charge control system according to claim 1, wherein based on the power consumption history, the processing circuitry acquires:

the required SOC obtained by multiplying a normal SOC by a required number of days determined by the allowable charge count, the normal SOC being a SOC normally consumed in one day;

a maximum SOC in a past predetermined period obtained from the power consumption history;

a first SOC obtained by adding the required SOC to a current SOC; and a second SOC obtained by adding the maximum SOC to a reference SOC, and wherein the processing circuitry sets a larger one of the first SOC and the second SOC as the upper limit SOC.

* * * * *